United States Patent [19]

Mitsuka

[11] Patent Number: 4,639,086
[45] Date of Patent: Jan. 27, 1987

[54] METHOD OF RECORDING A HALFTONE IMAGE

[75] Inventor: Ikuo Mitsuka, Shiga, Japan

[73] Assignee: Dainippon Screen Mfg. Co., Ltd., Kyoto, Japan

[21] Appl. No.: 816,994

[22] Filed: Jan. 9, 1986

Related U.S. Application Data

[63] Continuation of Ser. No. 510,871, Jul. 5, 1983, abandoned.

[30] Foreign Application Priority Data

Oct. 4, 1982 [JP] Japan .................. 57-175120

[51] Int. Cl.$^4$ ............................... G03F 5/00
[52] U.S. Cl. ................................. 350/322
[58] Field of Search ............ 346/108; 350/320, 322; 358/283, 298

[56] References Cited

U.S. PATENT DOCUMENTS 4,257,072 3/1981 Sakamoto .................. 358/298
4,390,882 6/1983 Ohara et al. ............... 358/298

FOREIGN PATENT DOCUMENTS 54-21123 7/1979 Japan .
55-44940 11/1980 Japan .
1493924 11/1977 United Kingdom .
1585971 11/1981 United Kingdom .

Primary Examiner—John K. Corbin
Assistant Examiner—Vincent J. Lemmo
Attorney, Agent, or Firm—Lowe, Price, Leblanc, Becker & Shur

[57] ABSTRACT

A halftone image is recorded on a photosensitive material by exposing the image to secondary exposing beam that is obtained by imparting to a primary beam two types of intensity modulation. The intensity modulation establishes a transmissivity distribution equivalent to that of a contact screen to which the halftone image is exposed.

2 Claims, 4 Drawing Figures

METHOD OF RECORDING A HALFTONE IMAGE

This application is a continuation of application Ser. No. 510,871 filed July 5, 1983, now abandoned.

FIELD OF THE INVENTION

This invention relates generally to a method of and apparatus for recording a halftone image on a photosensitive material using an exposing beam modulated by a data signal of an original picture, and particularly to such a method and apparatus in which the modulation simulates the transmissivity distribution of a contact screen.

BACKGROUND OF THE INVENTION

One conventional method proposed to record a halftone image by using image reproducing scanner devices such as those applied to photochemical processesis providing a lith-type film as a photosensitive material, placing a contact screen on the film, and exposing the film through a contact screen to a beam modulated by a data signal of an original picture. Although this is a simple method, it has a number of disadvantages. For example, it is preferred to place the contact screen on the lith-type film, and the contact screen is difficult to handle. Also, the halftone dots are produced by taking advantage of the high gamma characteristic of the lith film, resulting in an unstable size of the resultant halftone dots owing to the influence of fringing. This is a troublesome procedure, and sometimes results in redoing or retouching, such as dot-etching. Furthermore, because high intensity exposing light is needed, the cost of the equipment is high.

Another method for recording a halftone image is to record the halftone image with a beam through a lens and a contact screen which are set apart from a lith film and to keep a synchronous scanning relation with the lith film. This method, however, needs an additional drum for the contact screen along with the drum for an original picture and the lith film. The result is a large and complex system, with problems such as instability of dot size and light intensity remaining.

In a further method, a synthesized electric signal is obtained from individually and synchronously controlled scanning of an original picture and a contact screen to record a halftone image. This method, however, also requires an additional drum resulting in a large and complex system.

In contrast to these photographic methods, there is also, in the prior art, an electronic method to record a halftone image. This method involves dividing a single dot unit area of a contact screen which has a certain characteristic of gradation reproducibility, storing density distribution data of the divided areas into a memory and synthesizing these data with a scanned signal of an original picture. That method, however, is inferior in gradation reproducibility and has low resolving power and discontinuous gradation of density, when the division is too coarse. On the other hand, when fine division is performed, said defects are reduced, but other defects exist such as the requirement of high equipment cost owing to large memory devices. Also, the longer scanning time required in this method leads to lower manufacturing performance.

In another method to produce a halftone plate, disclosed in my Japanese Patent Publications No. 54-21123 and No. 55-44940, halftone dots are obtained on a photosensitive material with a flat exposing beam driven by an acoustic optic modulator (AOM) which controls width and position of the flat beam in accordance with the data signal corresponding to an original picture and positions of the halftone dots. This type of electrical method of recording a halftone image, however, usually requires more complex equipment.

SUMMARY OF THE INVENTION

One object of the invention, therefore, is to provide a new and improved method of and apparatus for recording a halftone image that is free from the above mentioned defects. Another object is to provide a halftone image recording method and apparatus that use electronic signal processing to simulate the transmissivity distribution of a contact screen.

To satisfy the above and other objects, a halftone image is recorded on a photosensitive material by an exposing beam which is two-dimensionally intensity-modulated to establish a transmissivity distribution which is equivalent to that of a contact screen. In one embodiment, the contact screen is assumed to make a 0° angle with the exposing beam. In another embodiment, the screen and beam are considered to be positioned at a non-zero angle relative to each other. The method can be applied to a very thin beam, to a parallel beam, or to a flat beam.

Still other objects of the present invention will become readily apparent to those skilled in this art from the following description wherein there is shown and described a preferred embodiment of this invention, simply by way of illustration of one of the best modes and alternative embodiments contemplated for carrying out the invention. As it will be realized, the invention is capable of still other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The present invention will become more clear from the following description of a preferred embodiment thereof with reference to the accompanying drawings in which.

DETAILED DESCRIPTION OF A PREFERRED EMBODIMENT

Figure 1:
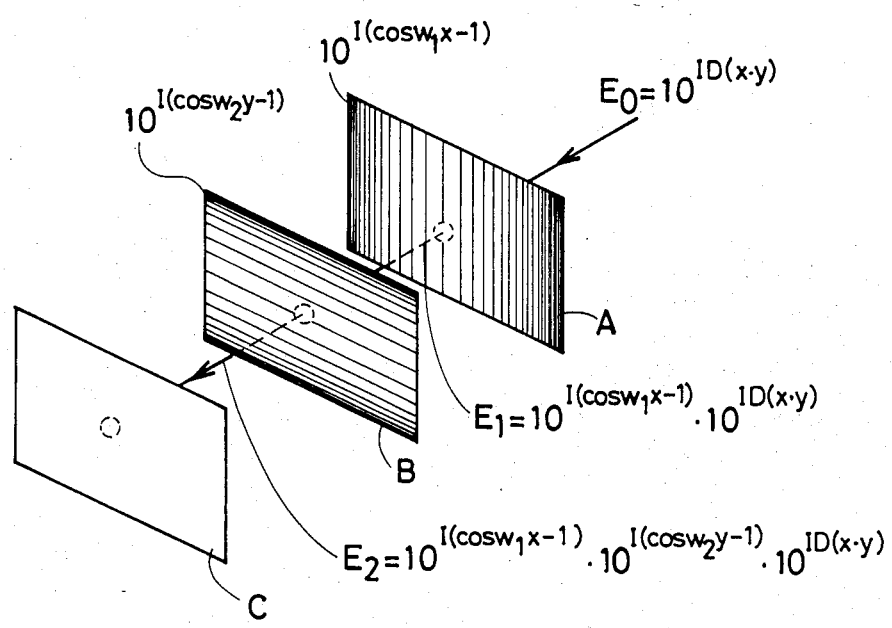
FIG. 1 shows the basic operation of this invention.

The present invention is based on the following principles. The conventional two-dimensional density distribution of halftone dots of a contact screen to record a halftone image, based upon a fundamental wave of spacial frequency components, is represented by the equation:

$$f(x, y) = I[2 + \cos w_1 x \cos w_2 y] \qquad (1)$$

where I is a standardization coefficient, and x and y are the two reference axes of a rectangular coordinate system such that the contact screen angle is at zero degree.

The symbol $w_1$ is the fundamental angular frequency of the density distribution on the x axis, and $w_2$ is the fundamental angular frequency of the density distribution on the y axis. When the screen angle is $\alpha$, said equation (1) can be converted into the equation $$f(x, y) = I[2 + \cos w_1 (x \cos \alpha - y \sin \alpha) + \cos w_2 (x \sin \alpha + y \cos \alpha)] \quad (2)$$

which can be simplified into $$f(x, y) + I[2 + \cos w_1(\gamma x - \delta y) + \cos w_2(\gamma x + \delta y)] \quad (2)'$$

when $\gamma$ and $\delta$ are substituted for $\cos \alpha$ and $\sin \alpha$, respectively.

Furthermore, assuming that scanning for exposure is performed in the direction y, a relationship between y and scanning time t being expressed as $y = k_1 t$, equation (2) can be converted into:

$$f(x, t) + I[2 + \cos (wax - wbk_1 t) + \cos k(wbx + wak_1 t)] \quad (3)$$

when wa, wb and $kw_1$ are substituted for $w_1\gamma$, $w_1\delta$ and $w_2$, respectively.

Equation (3) is interpreted as follows: Considering a two-dimensional density distribution of halftone dots of a contact screen as a function of the axis y(t), equation (3) in which a variable x is specified as $x_1$ can be expressed as:

$$f(t)x = x_1 = I[2 + \cos (wax_1 - wbk_1 t) + \cos k (wbx_1 + wak_1 t)] \quad (3)'$$

and can be simplified to:

$$f(t)x = x_1 + I[2 = \cos (\theta a - wbk_1 t) + \cos k (\theta b + wak_1 t)] \quad (3)''$$

when $\theta a$ and $\theta b$ are substituted for $wax_1$ and $wbx_1$ respectively. Equation (3)'' signifies that the density distribution of a contact screen is a synthesized value of $\cos (\theta a - wbk_1 t)$ and $\cos k(\theta b + wak_1 t)$. Thus, as the value of x varies, phase angles $\theta a$ and $\theta b$ vary.

This principle of density distribution of a contact screen can be utilized for recording halftone images with an exposing beam that is spacially intensity-modulated.

Thus, as said equation (1) represents a density distribution of halftone dots of a contact screen, it can be expressed as:

$$D'(x, y) = I(2 + \cos w_1 x + \cos w_2 y) \quad (4)$$

and still further converted into:

$$D'(x, y) = I[\cos w_1 x - 1 + \cos w_2 y - 1 + D(x, y)] \quad (4)'$$

when the equation (4) is transformed with both $\cos w_1 x$ and $\cos w_2 y$ remaining constant. $D(x, y)$ is the value of standard density i.e., a maximum density.

In the equations (4), (4)', if the value $D(x, y) = 4$, the value $D'(x, y)$ equals the value of $D(x, y)$, although, as mentioned later, the value $D(x, y)$ which varies from 0 to 4 is not equal to the value $D'(x, y)$ in a strict meaning but may be assumed to be equivalent to the value $D'(x, y)$ in practice.

The equation further may be changed in form as follows.

$$D(x, y) = I[\cos w_1 x - 1) + (\cos w_2 y - 1) + D(x, y)] \quad (5)$$

-continued $$= I[\log 10^{(\cos w_1 x - 1)} + \log 10^{(\cos w_2 y - 1)} + \log 10^{D(x,y)}]$$

$$= \log 10^{I(\cos w_1 x - 1)} + \log 10^{I(\cos w_2 y - 1)} + \log 10^{ID(xy)}$$

$$= \log 10^{I(\cos w_1 x - 1)} \cdot \log 10^{I(\cos w_2 y - 1)} \cdot \log 10^{ID(xy)}$$

As noted from equation (5), the value of density distribution $D(x, y)$ can be expressed as a logarithm product $10^{I(\cos w_1 x - 1)} \cdot 10^{I(\cos w_2 y - 1)} \cdot 10^{ID(xy)}$. On the other hand, since a blackening density is in proportion to a logarithm log E of an exposing amount E of a beam, the above value D(xy) can be presumed as a relation between both exposing amount $10^{I(xy)}$ and blackening density $D(x, y)$.

Assuming that $10^{I(\cos w_1 x - 1)}$ is a transmissivity distribution for axis x, $10^{I(\cos w_2 y - 1)}$ is a transmissivity distribution for axis y, and $10^{ID(xy)}$ is an intensity degree E of an exposing beam, the equation (5) describes the system shown in FIG. 1.

In other words, since the maximum values of $10^{I(\cos w_1 x - 1)}$ and $10^{I(\cos w_2 y - 1)}$ are both 1, while the minimum values are both 1/100, a transmissivity amount of from a maximum of 100% to a minimum of 1% can be obtained in comparison with an exposing amount of $10^{ID(xy)}$ resulting in the same effect as producing halftone dots with a contact screen.

Figure 2:
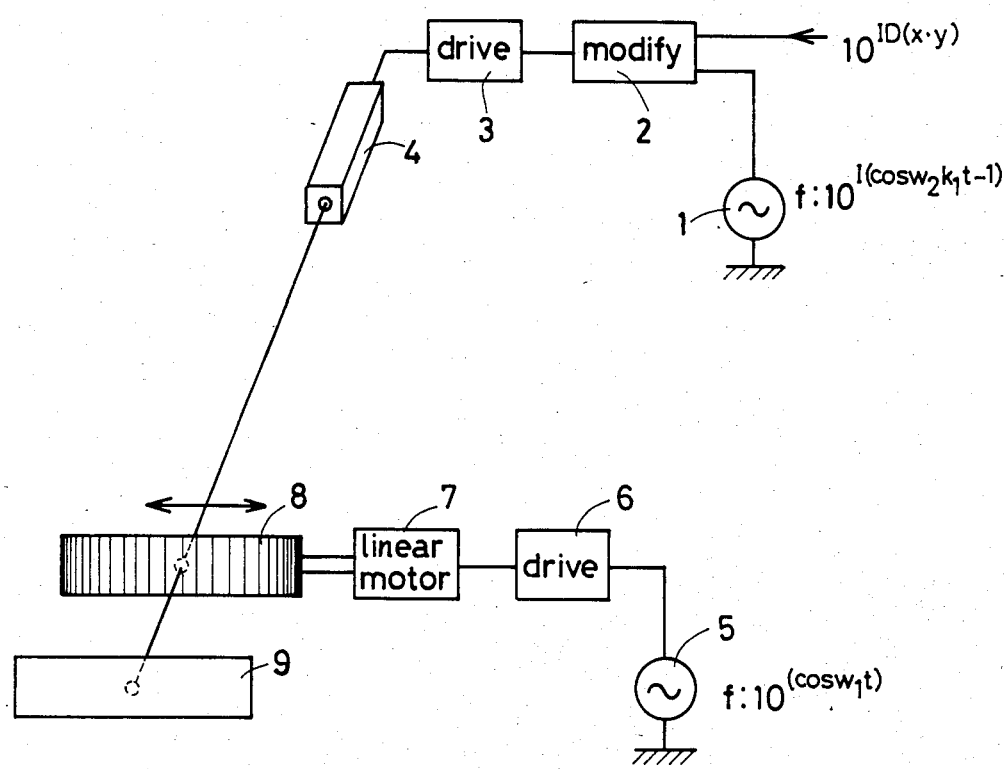
FIG. 2 is a first embodiment of this invention.

The following is an explanation of a physical system and its principle for producing halftone dots four-dimensionally. FIG. 2 shows a simplified example equivalent to that for producing halftone dots on a photosensitive material using a contact screen which makes an angle 0° with a thin exposing beam. In the above example, as the density distribution of main scanning direction must be correspondingly controlled with a spacial frequency determined by the line number of a contact screen due to use of a thin beam which may be generated by a laser (4) for exposure, a carrier which has a frequency $f = 10^{I(\cos w_2 k_1 t - 1)}$ generated by an oscillator (1) to make a driving signal $10^{ID(xy)}$ is modulated by a picture signal $10^{ID(xy)}$ in an AM-modulator $10^{I(\cos w_2 k_1 t - 1)}$ for controlling a beam driving circuit (3).

On the other hand, for a subscanning direction, a density filter (8) which has transmissive distribution of $10^{I(\cos w_1 x - 1)}$ for each subscanning position (determined by value x) is driven to alternate in a subscanning direction by a spacial frequency determined by the number of the screen ruling which is established through the oscillator (5) through a driving circuit (6) with use of a linear motor (7). Therefore the same halftone dots which have a gradually decreasing density distribution for main and subscanning directions are produced on a photosensitive material (9) such as a lith film as performed with use of a contact screen.

Figure 3:
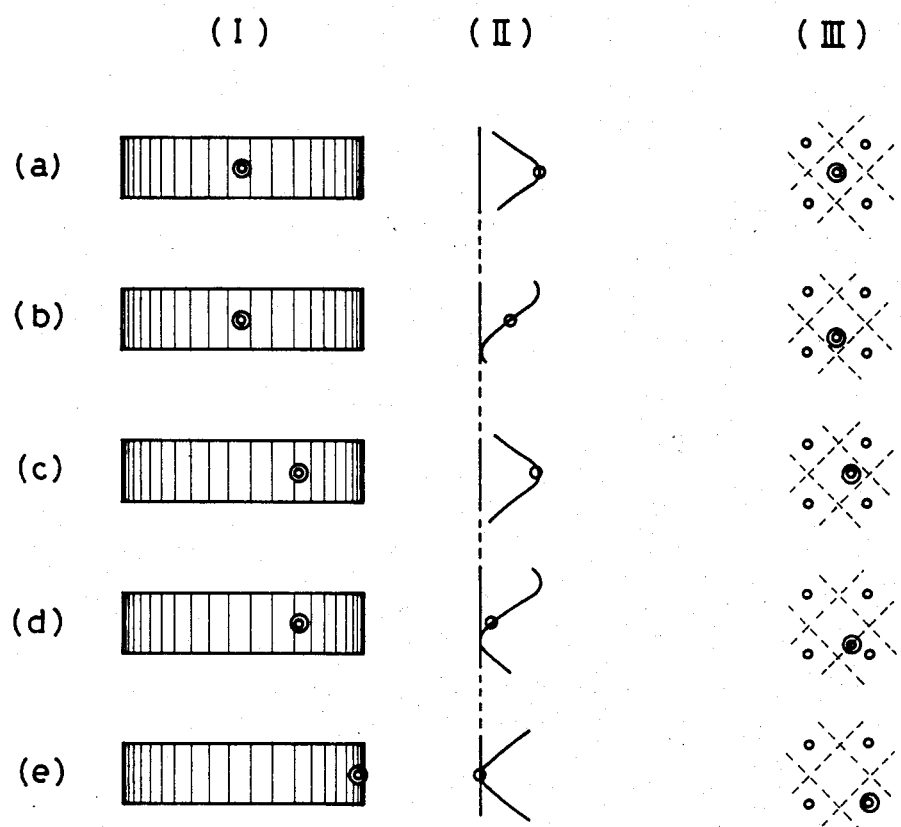
FIG. 3 shows a relation of between final recording point and a position of a contact screen when the method of this invention is used.

FIG. 3 shows that transmissivity density of parts of a contact screen (III) corresponds to that of dots of a photosensitive material produced by an exposing beam (indicated as a sign ⊙ in FIG. 3) which is intensity modulated in its main scanning direction with the aforesaid density filter (I). FIG. 3 further sets forth that such a gradually density filter (I) having variable transmissivity density gradually diminishes toward the subscanning direction and an intensity modulated beam in its direction of main scanning have an equivalent function to that of a contact screen. In FIG. 3, the sign (II) shows beam power intensity.

The aforesaid explanation is based on a case for producing halftone dots with a screen being at an angle 0° for simplification. The method of this invention can also, however, be applied to a case for producing halftone dots with a non-zero screen angle α.

When the latter case is performed, $x \cos α - y \sin α$ and $x \sin α + y \cos α$ are substituted for x, y of equation (5) respectively, to obtain the following equation.

$$D(x, y) = \log 10^{J[\cos w1(x \cos α - y \sin α) - 1]} \quad (6)$$
$$10^{J[\cos w2(x \sin α + y \cos α) - 1]}$$
$$10^{ID(x \cdot y)}$$

As the y-axis factor is equivalent to the time factor in this case, y can be replaced by $k_1 t$ leading to an equation $$D(x, y) = \log 10^{J[\cos w1(x \cos α - k_1 t \sin α) - 1]} \quad (7)$$
$$10^{J[\cos w2(x \sin α + k_1 t \cos α) - 1]}$$
$$10^{ID(x \cdot y)}$$

If the above case is put into practice with an apparatus as in FIG. 2, variation of the transmissivity ratio of the density filter (8) must be $10^{J[\cos w1(x \cos α - k_1 t \sin α) - 1]}$, while intensity modulation of laser beam (4) must be $10^{J[\cos w2(x \sin α - k_1 t \cos α) - 1]}$ if they are expressed as formulas.

In this case, the density filter (8) is driven rapidly along the subscanning direction at a frequency $\cos w_1 k_1 t$ of the main scanning direction. For example, assuming that halftone dots of which the screen ruling is 80 l/cm (200 l/in.) are produced on a film fixed on a recording cylinder having a circumference length of 75 cm and a revolution speed of 15 rps, said density filter (8) must be driven by a frequency $75 \times 15 \times 80 = 90$ kHz in a subscanning direction.

Therefore in this case, instead of a mechanically driven density filter, electrical means for modulating an exposing beam such as an acousto optic modulator (AOM) or a conventional density filter using Pockels effect is preferably adopted.

The aforesaid description is an explanation for producing halftone dots having a certain screen angle with the use of a single thin exposing beam. The method of this invention can, however, be applied for producing halftone dots having a certain screen angle with the use of an exposing beam having a section in the form of a line extending in the subscanning direction (hereinafter called a flat beam). For example, assuming that recording for one-half part of each halftone dot in one scan line using the flat beam having a cross section that is one-half the width of a halftone dot, an exposing beam must be intensity-modulated by a corresponding signal of a formula $10^{J[\cos w2(x \sin α - k_1 t \cos α) - 1]}$ of its main scanning factor. In addition, another intensity modulation corresponding to the phase of the x direction must be carried out at the same time, because the beam has a certain length of x(subscanning) direction.

Provided that said flat beam is composed of several thin beams arranged in parallel in the x direction and the thin beams can be controlled individually by devices such as an AOM, the same application as described above in the embodiment for producing halftone dots by using one thin beam can be used in multiplicity.

Figure 4:
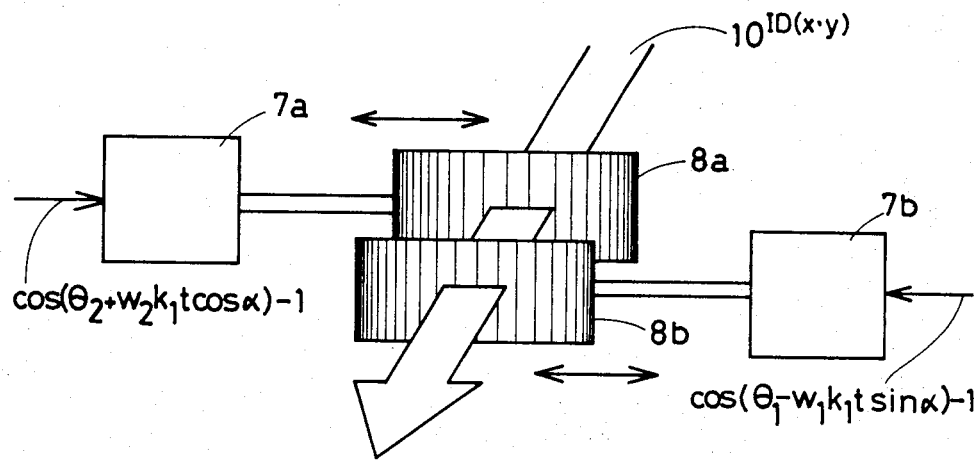
FIG. 4 illustrates another embodiment of this invention.

However, in a case wherein said flat beam is made via some optical system or slits from a single beam which cannot be individually intensity-modulated, multiple density filters are prepared as described in the case of producing halftone dots by a single exposing beam using a pair of screens which make a certain angle between them. Linear motors (7a), (7b) connected to respective density filters (8a), (8b) are driven reciprocally by control signals $\cos (θ_1 - w_1 k_1 t \sin α) - 1$ and $\cos (θ_2 + w_2 k_1 t \cos α) - 1$ respectively in the subscanning direction as shown in FIG. 4, where $θ_1 = w_1 x \cos α$, and $θ_2 = w_2 x \sin α$. Alternatively, in a case shown in FIG. 4, another embodiment wherein one filter is intensity-modulated by an AOM and the other is a mechanical filter can be realized.

What is especially noteworthy is that the aforesaid method of this invention can easily be applied to both conventional image reproducing systems of a drum scanner and laser beam scanners.

As is mentioned above, the method of this invention enables production of halftone dots equivalent to that made by a beam through a contact screen, by performing only certain optical intensity-modulation specified by corresponding transmissivity ratio on main and subscanning direction factors which is attained by modulating one or several exposing beam(s) with a signal obtained from an original picture.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize in the invention in various embodiments and with various modifications as are suited to the particular use contemplated. It is intended that the scope of the invention be defined by the claims appended hereto.

I claim:

1. A system for exposing an image of continuously varying intensity composed of halftone dots to a photosensitive material, comprising:
   means for obtaining original picture image signals;
   oscillator means for generating a carrier wave described by the formula:

$$10^{\cos w2(x \sin α + y \cos α) - 1};$$

where:
   $ω_2$ represents a fundamental frequency of transmissivity distribution in a main scanning direction,
   α represents a contact screen angle, and
   x, y are contact screen coordinates;
   means for multiplying said carrier wave by said image signals to obtain a modulation signal;
   a light source for generating a thin exposure beam;
   means responsive to said modulation signal for controlling said light source to intensity modulate said exposure beam;
   a filter having a predetermined density distribution; and
   means for oscillating said density filter;
   said exposing beam being directed through said oscillating density filter to further intensity modulate said beam in accordance with the formula:

$$10^{\cos w1(x \cos α - y \sin α) - 1}$$

where $\omega_1$ represents a fundamental frequency of transmissivity distribution in a subscanning direction, and $\alpha$ is the contact screen angle.

2. A method of exposing an image of continuously varying intensity composed of halftone dots to a photosensitive material, comprising the steps of:
obtaining original picture image signals;
generating a carrier wave described by the formula $$10^{\cos \omega_2(x \sin \alpha + y \cos \alpha) - 1}$$

where:
$\omega_2$ represents a fundamental frequency of transmissivity distribution in a main scanning direction,
$\alpha$ is a contact screen angle, and
x, y are contact screen coordinates;

multiplying said carrier wave by said image signals to obtain modulating signals;
generating a thin exposure beam;
modulating the intensity of said beam with said modulation signals to obtain a modulated exposure beam;
passing said modulated beam through a filter having a predetermined density distribution; and
oscillating said filter to further modulate said beam intensity in accordance with the formula;

$$10^{\cos \omega_1(x \cos \alpha - y \sin \alpha) - 1}$$

where: $\omega_1$ represents a fundamental frequency of transmissivity distribution in a subscanning direction, and $\alpha$ is the contact screen angle.

* * * * *